United States Patent Office

3,483,000
Patented Dec. 9, 1969

3,483,000
PROCESS OF PRODUCING FREEZE DRIED CANDY COATED GELATIN DESSERT
Maurie Laskin, Milwaukee, Wis., assignor to W. R. Grace & Co., New York, N.Y., a corporation of Connecticut
No Drawing. Filed June 18, 1965, Ser. No. 465,835
Int. Cl. A23g 3/00
U.S. Cl. 99—134          3 Claims

ABSTRACT OF THE DISCLOSURE

Freeze-dried gelatin dessert products encased in candy coating and method for producing high protein candy products.

---

This invention relates to lyophilized gelatin desserts and confections and to processes for preparing the same.

Edible gelatins prepared from collagenous materials are well known products. Conventionally the use of these products by the consumer involves dissolving the gelatin in a small amount of hot water and thereafter further diluting and chilling the diluted mixture. The chilling process permits the gelatin to set, after which it is ready for serving. These gelatin desserts are sold in a variety of flavors and forms. They may contain, in addition to gelatin, sugar as a sweetening agent, flavors, artificial sweeteners, such as cyclamates or saccharine, or they may be unmodified plain gelatin.

The gels formed may be considered as networks of gelatin disbursed in a fibrillar or laminar formation. The degree of dispersion is mostly colloidal. The structural elements of the gelatin system are subdivided by mechanical linkage including intermicellar forces in such a way that the liquid portion is subdivided into lyospheres.

Gelatin desserts in their conventional form provide a confection type of food with a high protein content. Due to their delicate nature, the gelatin products have heretofore been limited in the form in which they are served. This limitation resides in the fact that on warming the intermicellular forces are not sufficiently strong to retain the characteristic gel physical condition and the product simply "melts" or runs.

It would therefore be desirable to provide a means whereby one would be enabled to utilize the unique flavor and gustatory properties associated with gelatin desserts in a form more adaptable for other modes of serving and having the necessary stability for consumer or commercial storage without refrigeration.

Accordingly it is an object of the present invention to provide a method of dehydrating gelatin compositions to provide a stable food product which does not require refrigeration and which generally retains the original gel structure in an essentially dehydrated state.

A further object is the provision of novel gelatin desserts in dehydrated cellular form which are suitable for confection centerpieces.

A still further object is the provision of dehydrated gelatin dessert products which are rapidly rehydratable.

A still further object is the provision of a process which permits the ready adaptation of gelatin products into purees, jellies and similar confection and pastry fillings or toppings.

Accordingly, in one broad form the present invention comprises the lyophilization of gelatin desserts in a manner to preserve the original gel structure of the food products.

Another form of the present invention is the provision of a confectionery piece comprising a cellular low density gelatin centerpiece having a confectionery coating.

The dehydration of gelatin desserts is accomplished according to the present invention by lyophilization or freeze drying of the hydrated gelatin. The lyophilization step is carried out by freeze drying of the gelatin product in frozen or solid state. Accordingly it is necessary to freeze or chill the gelatin product prior to commencing the drying or lyophilization step. Freezing may be accomplished by conventional techniques or may be accomplished by evaporative cooling. The evaporative cooling involves applying a high vacuum to the chilled gelatin product and the resultant sublimation of moisture reduces the product temperature.

The pressure at which the freeze drying or lyophilization process is carried out is below the vapor pressure of ice at the temperature employed. For most purposes the pressure is below about 1.5 mms. of mercury and the most preferred aspects below about 1.0 mm. of mercury (absolute). All pressures as used herein are, unless otherwise indicated, absolute pressures.

During the dehydration process the heat of sublimation is supplied to the gelatin product by means of radiant energy, which in the typical apparatus is emanated from the heat exchanger platen or surface. In the initial stages of the lyophilization, little or no heat may be required, particularly if the product temperature equilibrium is being established by sublimation cooling under vacuum. When heating from outside sources is required to maintain a reasonable rate of dehydration it is provided by the heat exchangers. The platens thus may be operated over a wide range of temperatures and are adjusted to maintain sublimation or dehydration at a maximum, but not so high as to cause melting or thawing of the product. Preferably, higher temperatures are used in the inital stages of the drying process and they are reduced in a stepwise fashion as the dehydration approaches completion. Thus platen temperature may range from 250° F. down to about 90° F. and preferably from 160° F. to 90° F. The product temperature however should be maintained at a point where it remains in the frozen or unthawed state. The nature of gelatin is such as to cause melting or foaming if thawing is permitted.

An important objective of this invention is to produce a cellular gelatin product in dehydrated form whereby the gel structure of gelatin solids remain intact and only the water is removed. This results in a lightweight cellular gel or dry foam product which has all of the characteristics of the original gelatin food product with the exception that the water is removed. The conventional gelatin dessert has water as a major proportion of its mass. Accordingly the gelatin dessert in a dehydrated state has a density that is quite low, broadly stated in the order of from 0.03 to 0.2 gram per cc.

The freeze drying process is usually accomplished over a period of time, ranging from about 1 to 24 hours, although this is somewhat dependent on the capacity of the equipment.

The resulting freeze dried product is a low density material which can be rehydrated to produce the original product if desired. The freeze drying alters the characteristics of the gelatin product somewhat since the rehydration and gelling step can be accomplished rapidly without the necessity of dissolution in water and gelling. Accordingly the gelling step is shortened to such an extent that the result is an instant gelatin dessert. For this purpose the freeze dried gelatin product is preferably comminuted to a finely divided state prior to use. The result is that the consumer can take the freeze dried gelatin product, mix with water, and chill to gelation in a rather short period of time—much more so than with conventional gelatin desserts.

When the gelatin is lyophilized into monolithic slabs, the product can be used as a centerpiece for candy or confectionery products. Since lyophilized gelatin desserts are highly hygroscopic, it is necessary that the coating be such as will exclude atmospheric moisture, especially where no wrapper is used in the confection. Candy coatings, such as caramel, chocolate or both, are suitable for this purpose.

Unusual effects can be obtained with different flavored gelatin desserts in layers which are laminated together and freeze dried in that state or bound together in a sandwich with a candy coating. One particularly interesting combination is freeze dried gelatin and freeze dried ice cream, the latter disclosed in my copending application Ser. No. 324,240 filed Nov. 18, 1963, now abandoned.

The freeze dried gelatin represents a confection which has a high protein content. The product can also be used to manufacture an instant jelly or puree by mixing with water. The jelly is useful in providing fillings for pastries such as bismarcks and the like. The following examples will illustrate the preparation of the freeze dried gelatin products of this invention, having various flavors and containing various added fruits.

EXAMPLE 1

Strawberry gelatin dessert of the sugar free type was prepared in the conventional manner by mixing ½ ounce of dry flavored gelatin with 1 pint of boiling water. The gelatin was dissolved and the mixture poured into flat pans to a depth of about ½ inch, permitted to cool, and placed in a refrigerated chamber. When setting or gelation was complete the trays were further chilled to a temperature of about $-10°$ F.

The examples which follow illustrate various other combinations of gelatin dessert compositions both with sugar and sugar-free (dietetic) and containing fruit. In all cases the procedure followed is essentially as above described.

EXAMPLE 2

Raspberry gelatin (sugar free) _____oz__ ½
Water _____pint__ 1

EXAMPLE 3

Strawberry gelatin (with sugar) _____oz__ 1½
Banana gelatin (with sugar) _____oz__ 1½
Freeze dried peaches _____oz. (1 cup)__ 8
Water _____pint__ 1
(The peaches were first soaked in water for five minutes, drained and added to the gelatin water mix).

EXAMPLE 4

Orange gelatin (sugar sweetened) _____oz__ 3
Freeze dried peaches _____oz__ 8
Water _____pint__ 1

EXAMPLE 5

Pineapple and grapefruit gelatin
  (sugar sweetened) _____oz__ 3
Water _____pint__ 1

The frozen gelatin products in thin sheet form were placed in a lyophilization apparatus for freeze drying. Tables I and II following describe the conditions used in carrying out the freeze drying process.

TABLE I

| Example | Temperatures (° F.) | | | Platen | Vac. (mm.)[1] |
|---|---|---|---|---|---|
| | 1 | 4 | 5 | | |
| Time (min.): | | | | | |
| 0 | −16 | −24 | −23 | [2] 65 | Atm. |
| 10 | −21 | −21 | −21 | [2] 70 | .45 |
| 25 | −13 | −20 | −20 | 235 | .33 |
| 35 | −3 | −11 | −19 | 240 | .34 |
| 90 | [3] +18 | [3] +2 | −11 | 237 | .32 |
| 217 | 60 | 19 | 0 | 190 | .33 |
| 410 | 85 | 46 | 20 | 155 | .35 |
| 1,410 [4] | 105 | 105 | 105 | 122 | .30 |

[1] Pressures in mm. of mercury (absolute) atm.=atmospheric pressure.
[2] No heat in platens during startup of runs.
[3] Only transition to above zero marked with +.
[4] Overnight.

TABLE II

| Example | Temperature (° F.) | | Platen | Vac. (mm.) |
|---|---|---|---|---|
| | 2 | 3 | | |
| Time (min.): | | | | |
| 0 | −16 | −9 | | Atm. |
| 9 | −25 | −18 | | .28 |
| 12 | −28 | −25 | 100 | .25 |
| 24 | −23 | −24 | 200 | .34 |
| 95 | −5 | +8 | 175 | .34 |
| 220 | +7 | 50 | 150 | .30 |
| 414 | 83 | 85 | 120 | 0.22 |
| 1,440 [1] | [2] 132 | 128 | | 0.20 |

[1] Overnight.
[2] Final density of product 0.39 gram per cc.

As previously indicated, the products prepared by the foregoing examples are low density cellular gelatin foams. The following procedures were employed to manufacture a candy piece.

EXAMPLES 6 AND 7

A lyophilized gelatin product prepared in accordance with Examples 3 and 4 were cut into pieces approximately ½ inch thick, 1 inch wide and 3 inches long. The pieces were successively dip-coated with caramel and chocolate coatings. The resulting high protein candy piece was stable in the presence of atmospheric moisture.

EXAMPLE 8

Jellies for pastry filling were also prepared from the freeze dried gelatin products. These jellies were prepared by comminuting the dried product of Example 1 into a fine powder and mixing with 3 parts by weight of water. The resulting puree was smooth and free from grain. It was used as a filling for pastry (bismarck) products.

The gelatin products of the present invention also include gelatin based puddings or desserts which contain milk products. These products conventionally contain gelatin, sugar and milk, which latter is a replacement for water used.

Products similar to conventional gelatin desserts are those confectionery compositions sold under the trade name of "instant" puddings. These products usually contain milk as an ingredient, and a gelatinizing agent. These gelatinizing agents may be either a pre-gelatinized starch or a conventional gel forming agent, such as an alginate or a carrageenin. These compositions in large part, and particularly the latter two, require a cross linking agent to form the gel structure. Calcium salts are commonly used for this purpose. Typical alginate instant puddings are disclosed in U.S. Patent No. 2,808,337.

The following examples illustrate the preparation of calcium cross link alginate based products:

EXAMPLE 9

Alginate base instant pudding mix
  (vanilla flavor—sweetened) _____(av.)__ 6 oz.
Milk _____(fl.)__ 24 oz.

EXAMPLE 10

Alginate base instant pudding mix
  (butterscotch flavor—sweetened) ____(av.)__ 6 oz.
Milk _____(fl.)__ 24 oz.

The foregoing compositions were mixed thoroughly and placed in a flat tray. The product was refrigerated until set and then frozen at about $-10°$ F. The frozen puddings were then lyophilized at pressures (abs.) ranging from about .20 to .39 mm. (Hg). Sublimation cooling without platen heat brought the initial temperature down to about $-16$ to $-18°$ F. prior to the commencement of platen heating. Platen heating was initiated after 15 minutes of evaporative cooling (product temperature below about $-15°$ F.) ranged from an initial 100 to 200° F. in the first stages and dropped over the drying period to about 120° F. The total lyophilization time was about 24 hours to a less than 1% moisture content.

The products of the present invention are characterized by low moisture contents, generally less than about 2% and preferably less than 1%. Low density is another characteristic of the products of the present invention, which is obviously advantageous from the point of view of shipping, handling or the like.

As previously indicated, the gelatin based dessert products of the present invention have a density with respect to the gelatin portion of from 0.03 to about 0.2 gram per cubic centimeters. They may be characterized as having a network structure of gelatin protein fibers in cellular foam form, and as having a moisture content of less than about 2%. It should be understood that the density above referred to is with respect to the gelatin portion, including sweeteners and flavor, but does not refer to the fruit portion, if such is included in the product.

As indicated in the foregoing, the gelatin products of this invention are highly hygroscopic. For this reason it is advisable to use a barrier coating, such as caramel, chocolate, candy, or the like, to protect the freeze dried gelatin from atmospheric or other moisture. It is apparent that other edible coatings may also be used, such as for example, sodium carboxymethylcellulose, methylcellulose, hydroxypropylmethylcellulose, and the like. The products thus coated may be used, for example, as additives in dry cereals, as food for astronauts, etc.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. A method for manufacturing a high protein candy piece which comprises forming and gelling a gelatin dessert product, freezing the gelled dessert to convert the water portion to the solid state, lyophilizing the frozen set gelatin product to dehydrate the same to a moisture content of less than about 2%, the lyophilization being carried out at pressures of less than about 1.5 millimeters of mercury (absolute) and the rate of dehydration being such as to maintain the fibrous gelatin structure in its original spatial relationship to produce a dehydrated cellular gelatin product in low density foam form having a density of from about 0.03 to about 0.2 gram per cubic centimeter, and encasing pieces of the dehydrated low density gelatin dessert foam in a confectionery candy coating.

2. Method according to claim 1 wherein the confectionery candy coating is a chocolate coating.

3. Method according to claim 1 wherein the confectionery candy coating is a laminate of caramel and chocolate coatings.

References Cited

UNITED STATES PATENTS

| | | | |
|---|---|---|---|
| 1,127,114 | 2/1915 | Thompson | 99—199 XR |
| 2,166,074 | 7/1939 | Reichel | 99—199 XR |

RAYMOND N. JONES, Primary Examiner

J. M. HUNTER, Assistant Examiner

U.S. Cl. X.R.

99—83, 129, 130, 139